(12) United States Patent
Hart et al.

(10) Patent No.: US 9,548,793 B2
(45) Date of Patent: *Jan. 17, 2017

(54) COMMUNICATIONS LINK DISCONTINUITY DETECTION SYSTEMS AND METHODS

(71) Applicant: AT&T INTELLECTUAL PROPERTY I, LP, Atlanta, GA (US)

(72) Inventors: Richard Hart, Cameron Park, CA (US); Xiaochuan Yi, Danville, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/937,387

(22) Filed: Nov. 10, 2015

(65) Prior Publication Data

US 2016/0065267 A1 Mar. 3, 2016

Related U.S. Application Data

(63) Continuation of application No. 12/333,235, filed on Dec. 11, 2008, now Pat. No. 9,215,101.

(51) Int. Cl.
*H04B 3/46* (2015.01)
*H04L 25/02* (2006.01)
*H04L 25/08* (2006.01)

(52) U.S. Cl.
CPC .............. *H04B 3/46* (2013.01); *H04L 25/0278* (2013.01); *H04L 25/08* (2013.01)

(58) Field of Classification Search
CPC ........ H04B 3/46; H04L 25/08; H04L 25/0278; H04L 43/50; H04L 12/26; H04L 12/2697; G01R 31/08; G01R 31/11
See application file for complete search history.

(56) References Cited

U.S. PATENT DOCUMENTS

| | | |
|---|---|---|
| 6,298,315 B1 | 10/2001 | Li |
| 6,522,152 B1 | 2/2003 | Tonti et al. |
| 6,532,215 B1 * | 3/2003 | Muntz ..................... H04B 3/493 370/242 |
| 7,385,932 B2 | 6/2008 | Dodds |
| 2002/0180954 A1 * | 12/2002 | Qian .................. G01M 11/3145 356/73.1 |
| 2004/0230385 A1 * | 11/2004 | Bechhoefer ............ G01R 31/11 702/57 |
| 2005/0057880 A1 | 3/2005 | Bailey et al. |
| 2005/0222798 A1 | 10/2005 | Waschura et al. |

(Continued)

*Primary Examiner* — George Eng
*Assistant Examiner* — Hung Du
(74) *Attorney, Agent, or Firm* — Guntin & Gust, PLC; Jay H. Anderson

(57) ABSTRACT

Systems and methods for detecting and analyzing discontinuities in a communications link are disclosed. In some embodiments, the systems and methods operate to project signals into the communications link and detecting reflected signals. The reflected signals are processed to define a transformed distribution of the reflected signals. A peak value in the transformed distribution is selected and a local fit to the selected peak value is performed using a model function. A residue distribution is formed based upon the transformed distribution and the model function. A location of the discontinuity based upon the residue distribution is identified, and another peak value from the residue distribution is selected. Additional systems and methods are disclosed.

20 Claims, 7 Drawing Sheets

(56) References Cited

U.S. PATENT DOCUMENTS

| | | | |
|---|---|---|---|
| 2005/0238037 A1* | 10/2005 | Dodds | H04L 43/50 370/420 |
| 2006/0012376 A1* | 1/2006 | Furse | G01R 31/11 324/534 |
| 2006/0097730 A1* | 5/2006 | Park | G01R 31/088 324/534 |
| 2007/0025548 A1* | 2/2007 | Zheng | H04B 3/46 379/406.01 |

* cited by examiner

COMMUNICATIONS LINK DISCONTINUITY DETECTION SYSTEMS AND METHODS

CROSS-REFERENCE TO RELATED APPLICATIONS

This application is a continuation of U.S. patent application Ser. No. 12/333,235, filed Dec. 11, 2008, which is incorporated herein by reference in its entirety.

FIELD OF THE DISCLOSURE

This application relates generally to telecommunications networks, and more particularly, to the detection of signal discontinuities in telecommunications networks.

BACKGROUND

A continuing demand for additional digital communication services has prompted services providers to investigate additional ways to further optimize the bandwidth and signal transfer capabilities of existing communications systems. In many cases, the existing communication systems include telephone networks using metallic twisted pairs that were configured to communicate a single channel of analog voice signals having a relatively low frequency range (e.g., predominantly below about 10 kHz).

Increasingly, telephone networks are used to carry transmissions other than analog voice signals. For example, a variety of digital services, such as Integrated Services Digital Network (ISDN), Digital Subscriber Line (DSL), Asymmetric Digital Subscriber Line (ASDL), High Bit-Rate Digital Subscriber Line (HDSL) and Very High Bit-Rate Digital Subscriber Line (VDSL) are communicated using communications links in telephone networks.

Existing telephone networks generally include various signal discontinuities. For example, terminated and non-terminated bridged taps may exist along communications links that introduce the signal discontinuities. At the relatively low frequencies used in analog voice communications, the presence of such discontinuities did not significantly affect signal transmission along a communications link in the telephone network However, since the foregoing digital services generally operate at much higher frequencies than analog voice transmissions, the presence of the various signal discontinuities can create problems with their transmission.

BRIEF DESCRIPTION OF THE DRAWINGS

Various embodiments are described in detail in the discussion below and with reference to the following drawings.

DETAILED DESCRIPTION

The various embodiments include systems and methods for detecting and analyzing discontinuities in a communications link. Specific details of several embodiments are set forth in the following description and in FIGS. 1 through 10 to provide an understanding of such embodiments. One of ordinary skill in the art, however, will understand that additional embodiments are possible, and that many embodiments may be practiced without several of the details disclosed in the following description.

Figure 1:
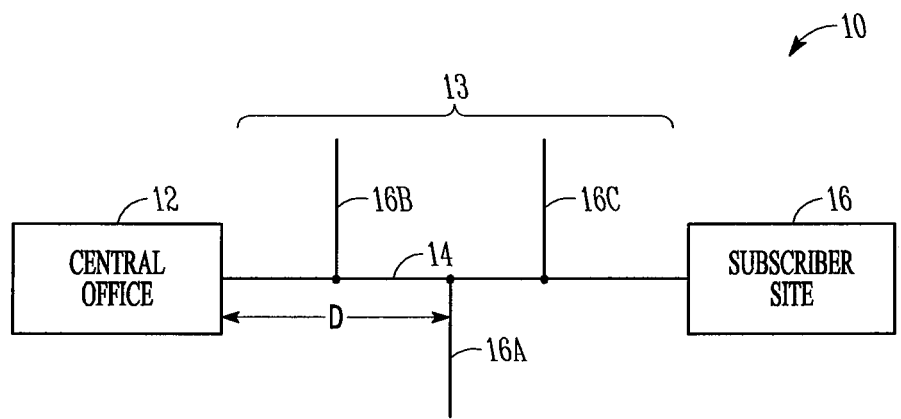
FIG. 1 is a diagrammatic block view of a telephone communications system according to the prior art.

FIG. 1 is a diagrammatic block view of a telephone communications system 10 according to the prior art. The system 10 may include a central office 12 that is operable to switch communications circuits so that a communications link 13 may be established between the central office 12 and a subscriber site 16. The communications link 13 may extend various distances between the central office 12 and the subscriber site 16, depending on the communications link 13 established by the central office 12. In general, however, the communications link 13 may extend between hundreds of feet to many miles.

The communications link 13 may include a transmission line 14, such as a twisted pair (e.g., a "tip" and a "ring" pair) having a characteristic impedance. The communications link 13 may also include at least one bridged tap 16a that is located at a fixed distance D from the central office 12. The at least one bridged tap 16a is generally compatible with the transmission line 14, and may also include a twisted pair (e.g., a "tip" and a "ring" pair) having a characteristic impedance that is similar to the transmission line 14. Other bridged taps 16b and 16c may also be present, which may be located at distances that are less that D, or greater than D, respectively. Although FIG. 1 shows three bridged taps (e.g., 16a-16c), it is understood that the communications link 13 may include fewer than three bridged taps, or more than three bridged taps. In addition, the bridged taps 16a-16c may include various lengths as the bridged taps 16a-16c extend outwardly from the transmission line 14.

The bridged taps 16a-16c may include various termination conditions at respective ends of the bridged taps 16a-16c. For example, one or more of the bridged taps 16a-16c may include an 'open' termination condition, while others of the bridged taps 16a-16c may include a 'closed' termination condition, which may include a resistive termination, or even a 'shorted' termination. In general, the bridged taps 16a-16c may be coupled to the transmission line 14 at locations along the transmission line 14 that are not known. In addition, the termination conditions of the bridged taps 16a-16c may also be unknown.

When a signal is propagated along the transmission line 14, the presence of the bridged taps 16a-16c causes signal reflections to occur when the signal encounters junctions between the bridged taps 16a-16c and the transmission line 14. The signal reflections occur due to localized impedance variations (e.g., a departure from the characteristic impedance of the transmission line 14) occurring at the junctions. Due to propagation of the signals along the bridged taps 16a-16c and the subsequent reflection of the signal from the ends of the bridged taps 16a-16c, additional reflections may occur. The reflections generally reduce the signal communications capability due to losses in signal energy as the signal propagates along the communications link 13.

Figure 2:
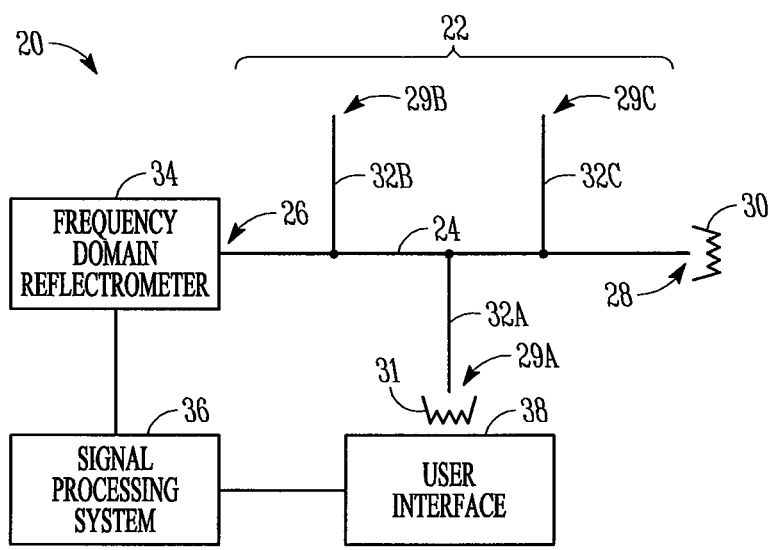
FIG. 2 is a diagrammatic block view of a system for detecting a discontinuity in a communications link, according to the various embodiments.

FIG. 2 is a diagrammatic block view of a system 20 for detecting a discontinuity in a communications link, according to the various embodiments. In the discussion that follows, the communications link 22 constitutes a line under test (LUT), and includes a transmission line 24 having an input portion 26 and a terminal end portion 28. The communications link 22 may be terminated at the terminal end portion 28 by a selected termination resistance 30, which may be approximately equivalent to a characteristic impedance of the transmission line 24, although other values for the termination resistance 30 may be used. Alternatively, the transmission line 22 may be 'open' at the terminal end portion 28, or 'shorted' at the terminal end portion 28. The communications link 22 may also include bridged taps 32a-32c coupled to the transmission line 22. The bridged taps 32a-32c may also include respective terminal end portions 29a-29c that may be 'open', or 'shorted' or may be terminated with a known resistance 31, which may correspond to a characteristic impedance of the transmission line 24. Again, although three bridged taps (e.g., 32a-32c) are shown in FIG. 2, it is understood that the communications link 22 may include fewer than three bridged taps, or more than three bridged taps, which may have various lengths as they extend outwardly from the transmission line 24.

The system 20 may also include a frequency domain reflectometer 34 that may be operably coupled to the communications link 22. In general terms, the frequency domain reflectometer 34 is configured to generate a frequency-swept sinusoidal waveform, which may be varied in a linear, or a stepwise manner, that begins at a selected minimum frequency and increases upwardly in frequency until a selected maximum frequency is reached. Alternatively, the frequency-swept sinusoidal waveform may begin at the selected maximum frequency, and decrease downwardly until the selected minimum frequency is reached. In either case, the frequency-swept sinusoidal waveform is applied to the input portion 26 of the communications link 22. It is understood, however, that other waveform shapes may also be used.

The frequency domain reflectometer 34 may also be configured to receive reflected signals from the communications link 22 and to suitably process the reflected signals, which may include digitizing the reflected signals using an analog to digital converter (ADC) (not shown in FIG. 2), and storing the digitized signals in a reflected signal buffer (also not shown in FIG. 2).

The system 20 may also include a signal processor 36 that is configured to receive the reflected signals and to execute methods according to various embodiments, to be described in greater detail below. Accordingly, the signal processor 36 may include a central processing unit (CPU), which may include any digital device capable of receiving data and programmed instructions, and processing the data according to the programmed instructions. The CPU may be configured to communicate with a memory unit over a suitable communications bus. The signal processor 36 may also include various other devices that are operably coupled to the bus, which are configured to cooperatively interact with the CPU and the memory unit. For example, the signal processor 36 may include one or more input/output (I/O) devices, such as a printer, a display device, a keyboard, a mouse, and other known input/output devices, which are collectively shown in FIG. 2 as the user interface 38. The signal processor 36 may also include a mass storage device, which may include a hard disk drive, a floppy disk drive, an optical disk device (CD-ROM), and other similar devices.

As previously noted, the signal processor 36 may be suitably programmed to analyze the reflected signal spectrum. Accordingly, the signal processor 36 may transform the digitized spectrum received from the frequency domain reflectometer 34. For example, a discrete Fourier transform algorithm, such as a selected one of the known fast Fourier transform algorithms, or other suitable Fourier transform algorithms may be used. Briefly, and in general terms, the discrete Fourier transform algorithm generates a reflection coefficient distribution for the communications link 22 (FIG. 2), which will be discussed in greater detail below. The reflection coefficient distribution may then be further processed by the signal processor 36 in accordance with various embodiments, as noted below.

Although FIG. 2 shows the frequency domain reflectometer 34, the signal processor 36 and the user interface 38 as separate units, it is understood that other configurations are possible. For example, one or more of the frequency domain reflectometer 34, the signal processor 36 and the user interface 38 may be incorporated into the central office 12 (FIG. 1). In another example, at least one of the frequency domain reflectometer 34, the signal processor 36 and the user interface 38 may be included in a line card installed within the central office 12 that is operably coupled to the communications link 22. Still other configurations are within the scope of the disclosed embodiments. As a further example, one or more of the frequency domain reflectometer 34, the signal processor 36 and the user interface 38 may include separate (e.g., 'stand alone') modules that may be removably coupled to the input portion 26 of the communications link 22 during a test period.

Figure 3:
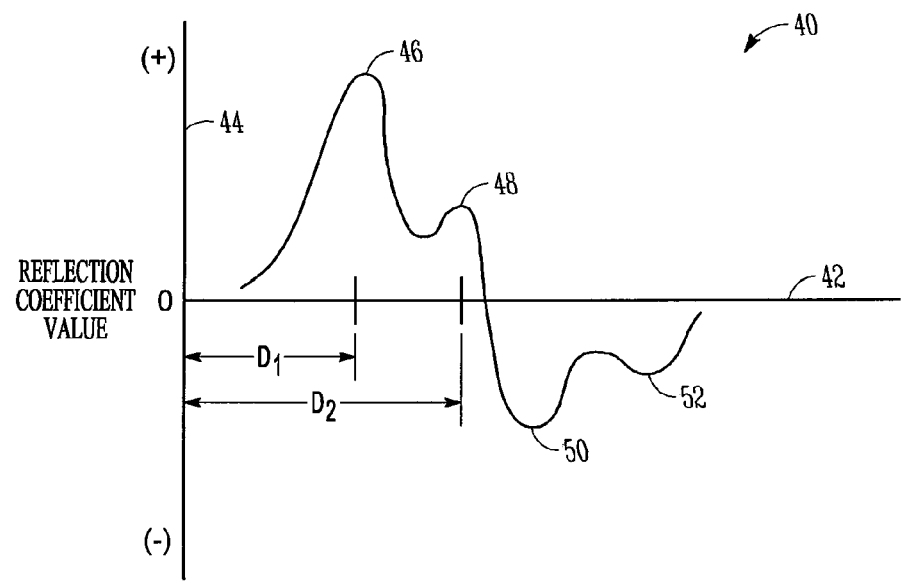
FIG. 3 is a graphical representation of a reflection coefficient distribution 40 for the communications link of FIG. 2.

FIG. 3 is a graphical representation of a reflection coefficient distribution 40 for a communications link of FIG. 2. The link (see element 22 in FIG. 2) includes various bridged taps that will be used to describe information that may be generated by the system 20 of FIG. 2. Referring now to FIGS. 2 and 3, it can be seen that a first axis 42 corresponds to a distance along the communications link 22, while a second axis 44 corresponds to a magnitude of reflection coefficient values in the distribution 40. It is understood, however, that a distance along the communications link 22 may, in general, include a physical distance along the transmission line 24 and a distance along a bridged tap coupled to the transmission line 24.

The reflection coefficient distribution 40 may be obtained by suitably transforming the reflected signals detected by the frequency domain reflectometer 34. The distribution 40 may accordingly assume positive values, which may include a first peak value 46 and a second peak value 48. The first peak value 46 and the second peak value 48 generally correspond to a higher impedance in the communications link 22 located at approximate distances $D_1$ and $D_2$ along the communications link 22, respectively. It is understood that the approximate distances $D_1$ and $D_2$ may correspond to physical distances along the transmission line 24 and further along a bridged tap coupled to the transmission line 24. Since the first peak value 46 and the second peak value 48 are positive, a termination condition (e.g., an impedance) for the bridged taps may comprise an open state.

The reflection coefficient distribution 40 may also assume negative values, which may include a third peak value 50 and a fourth peak value 52. The third peak value 50 and the fourth peak value 52 generally correspond to a lower impedance in the communications link 22, which may be located at other distances along the communications link 22 that are greater than $D_2$. Since the third peak value 50 and the fourth peak value 52 are negative, a termination condition for bridged taps that cause the third peak value 50 and the fourth peak value 52 may comprise a shorted state (e.g., the bridged tap is shorted at the terminal point, or terminated by a relatively low resistance with respect to the characteristic line impedance). Although the reflection coefficient distribution 40 shows four peak values in a particular order, it is understood that there may be more or less than four peak values, which may occur in any order. It is also understood that not all of the peak values shown in the reflection coefficient distribution 40 correspond to discontinuities in a communications link 22. Accordingly, at least some of the peak values may correspond to signal reflections from various portions of the line, and may therefore be eliminated as discontinuities.

Figure 5:
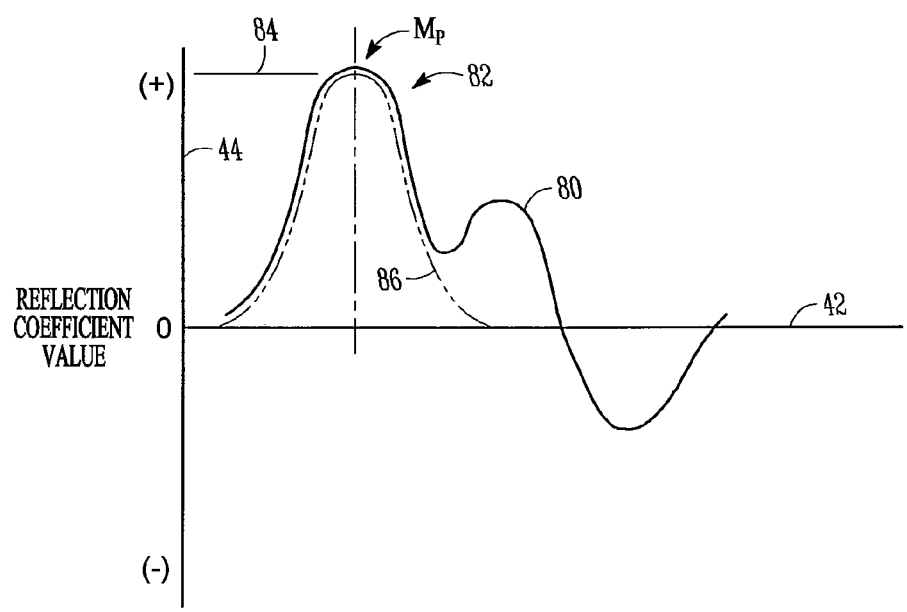
FIG. 5 is a graphical representation of a reflection coefficient distribution in accordance with the method of FIG. 4.
Figure 4:
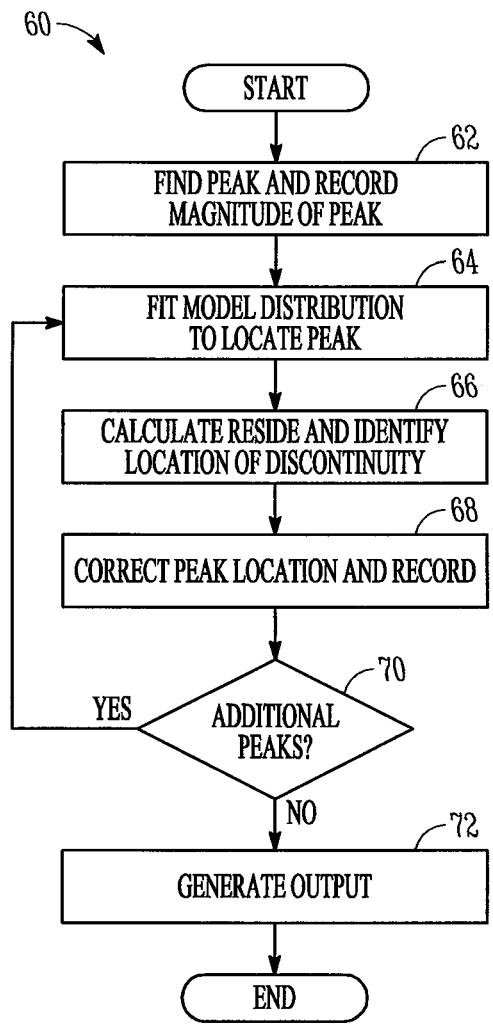
FIG. 4 is a flowchart of a method of detecting a discontinuity in a communications link, according to the various embodiments.

With reference now to FIG. 4, and also to FIG. 5 through FIG. 8, a method 60 of detecting a discontinuity in a communications link, according to the various embodiments, will be described in detail. The method 60 is applicable to detect discontinuities in a communications link, such as the communications link 22 shown in FIG. 2. At block 62, a peak value and a corresponding magnitude may be located and recorded in a reflection coefficient distribution. The peak value and the corresponding magnitude are selected with respect to the most significant peak (e.g., the peak value with the greatest absolute magnitude) and then to less significant peaks in descending order (e.g., to the next peak location having the next highest magnitude), even though other intervening peak locations may be present. Referring now also briefly to FIG. 5, a graphical representation of a reflection coefficient distribution 80 includes a first peak value 82 having a magnitude 84, which is identified and recorded. The magnitude 84 is determined to be the most significant peak location, since the magnitude 84 is found to be greater in absolute value than magnitudes at other peak locations. At block 64, a model distribution is locally fit to the reflection coefficient distribution 80 at the first peak value 82. For example, and in accordance with the various embodiments, a Gaussian distribution may be used, and will be assumed in the discussion that follows, although it is understood that other suitable model distributions may also be used. As shown in FIG. 5, the Gaussian distribution 86 is determined by regression, selecting the magnitude 84 as an amplitude portion of the Gaussian distribution 86, and iterating a value of a curve fitting parameter ($\sigma$) until the Gaussian distribution 86 satisfies a predetermined criterion. A final value for the curve fitting parameter ($\sigma$) may be selected, for example, using a chi-squared test ($\chi^2$) to assess the suitability of the curve fitting parameter ($\sigma$), although other regression methods may also be used. In accordance with the various embodiments, the curve fitting parameter ($\sigma$), which physically corresponds to a distance along the communications link 22 (FIG. 2) may range between approximately three and eight.

Figure 6:
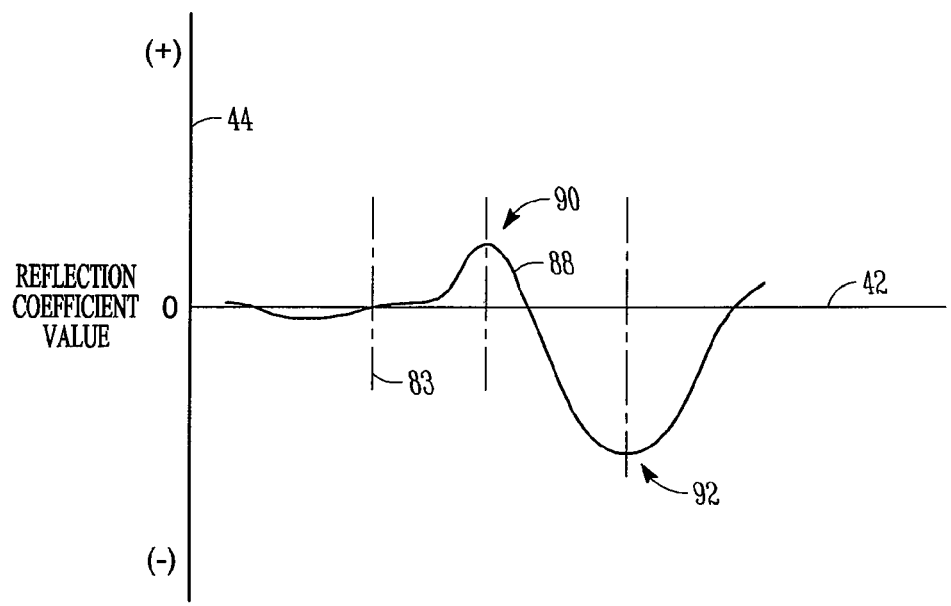
FIG. 6 is a graphical representation of a reflection coefficient distribution in accordance with the method of FIG. 4.

With reference still to FIG. 4, at block 66, a residue distribution may be calculated. With reference to also to FIG. 6, a residue distribution 88 may be determined by forming a difference between the reflection coefficient distribution 80 and the Gaussian distribution 86 of FIG. 5. Accordingly, the residue distribution 88 is approximately zero at location 83, and is generally non-zero at other locations. Accordingly, the location 83 may correspond to the location of a discontinuity. The location 83 may be further corrected to account for actual electrical properties in a communications link to further define an actual location of the discontinuity. Accordingly, at block 68, the location 83 may be further corrected to obtain a corrected (e.g., a 'true') location. A correction method will be discussed below.

Figure 7:
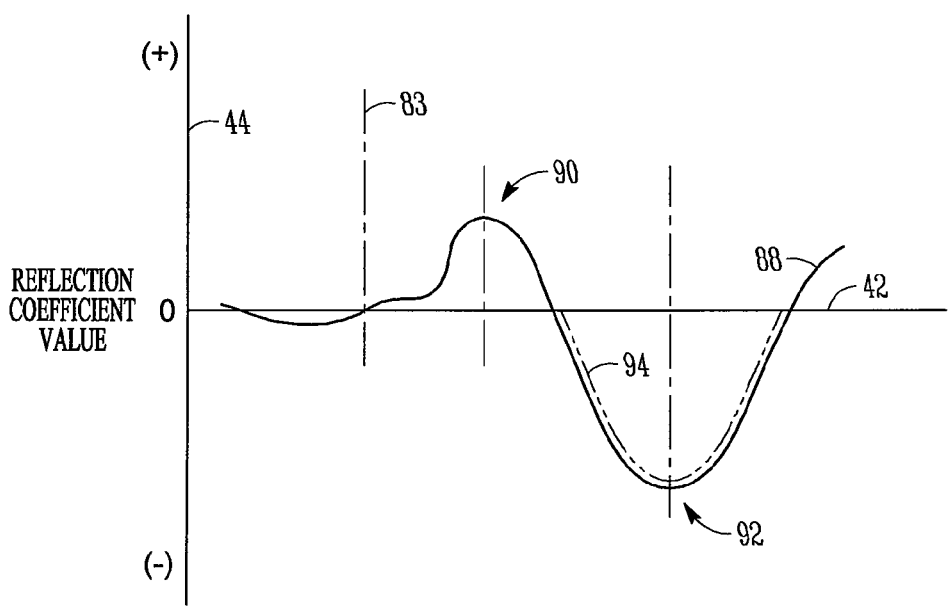
FIG. 7 is a graphical representation of a reflection coefficient distribution in accordance with the method of FIG. 4.
Figure 8:
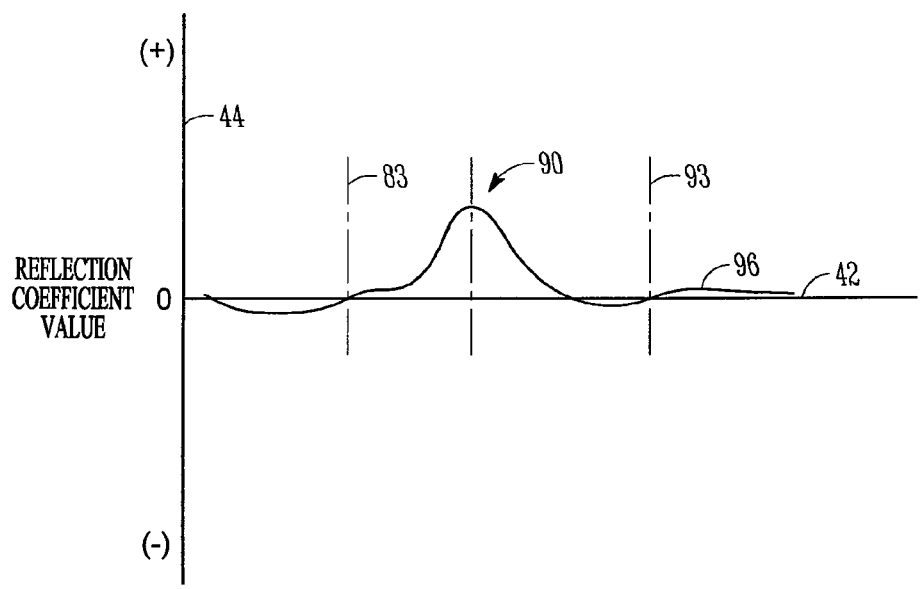
FIG. 8 is a graphical representation of a reflection coefficient distribution in accordance with the method of FIG. 4.

At block 70, the method 60 determines if another peak is present. As discussed in detail above, the next most significant peak, as determined by relative magnitudes, is selected. Referring still to FIG. 6, a second peak 90 in the residue distribution 88 is located, but since it does not have the next highest magnitude, a third peak 92 is selected. Accordingly, at block 70, the method 60 returns to block 64, and a Gaussian distribution 94 is locally fit to the residue distribution 88 at the third peak 92, as shown in FIG. 7. A residue distribution 96 may then be calculated by execution of block 66 of FIG. 4. As shown in FIG. 8, a location 93 corresponding to the location of an additional discontinuity may be identified. The location 93 may then be corrected at block 68.

In general, the most significant peaks (e.g., the first peak 82 and the third peak 92) may indicate the presence of discontinuities, such as a bridged tap, while other peaks of lesser magnitude (e.g., the second peak 90) may represent reflections from the end of the communications link, or reflections from the end of the bridged tap, or both. Accordingly, since no other additional peaks are detected, the method 60 of FIG. 4 terminates at block 72 with the generation of an output that may include corrected locations and relative strengths of the detected discontinuities.

Figure 9:
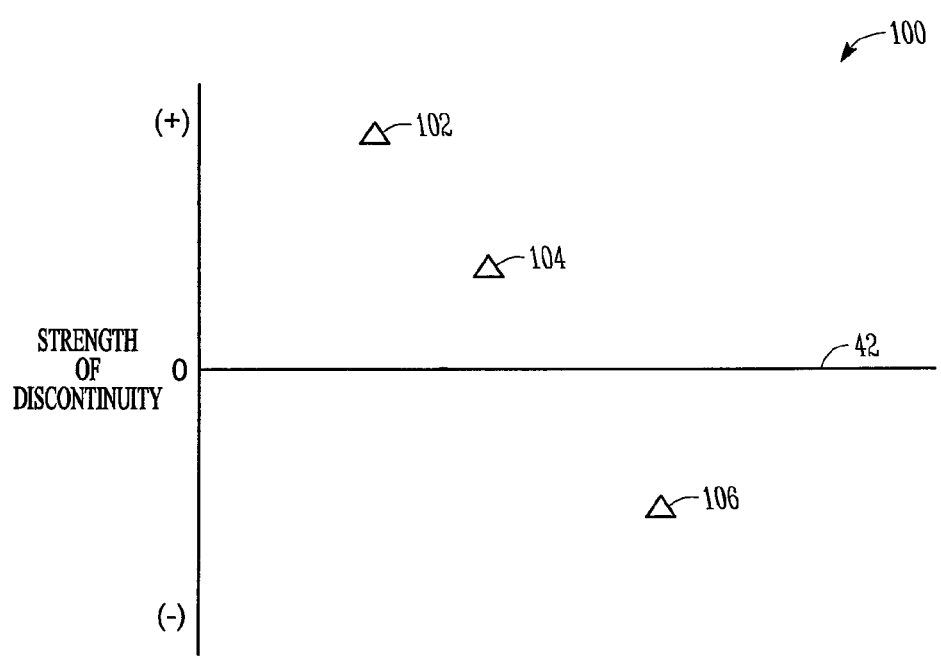
FIG. 9 is a graphical representation of an output resulting from an analysis of a reflection coefficient distribution.

FIG. 9 is a graphical representation that shows an output 100 resulting from the foregoing analysis of the reflection coefficient distribution 80. Accordingly, a first discontinuity 102 having a positive strength is positioned at the location 83, and may correspond to a bridged tap having an open termination condition. An intermediate reflection 104 corresponding to the second peak value 90 may result from reflections along the communications link, and may be disregarded as a physical discontinuity. A second discontinuity 106 having a negative strength is positioned at the location 93, and may correspond to a bridged tap having a shorted termination condition. It is noted that, in further analysis of a communications link, the bridged taps may be alternated between an open termination condition and a shorted termination condition (or terminated using a known resistance) in order to add additional resolution to the results. Although FIG. 5 shows three peaks in the reflection coefficient distribution 80, it is understood that the distribution 80, as well as the successive determination of the peak values as shown in FIG. 6 through FIG. 8 are merely illustrative. Accordingly, fewer than three peaks, or more than three peaks may be present.

Figure 10:
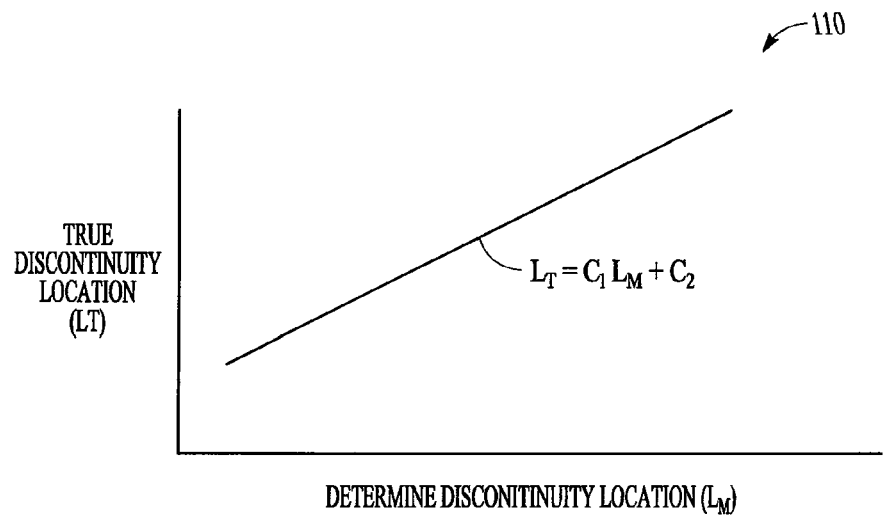
FIG. 10 is a graphical representation of a positional correction that may be applied to the detected discontinuity locations, according to the various embodiments.

As noted above, the location 83 and the location 93 were subjected to a correction in the method 60 of FIG. 4 in order to obtain a corrected location. FIG. 10 is a graphical representation of a positional correction 110 that may be applied to the discontinuity locations, according to the various embodiments.

The positional correction 110 may include a linear relation that relates a determined discontinuity location ($L_M$) to a true discontinuity location ($L_T$).

Although specific values for the constants $C_1$ and $C_2$ may be determined empirically by testing actual communications links having known characteristics, in the various embodiments, $C_1$ may range between approximately 0.8 and 1.2, and $C_2$ may range between approximately 60 and 70.

Figure 11:
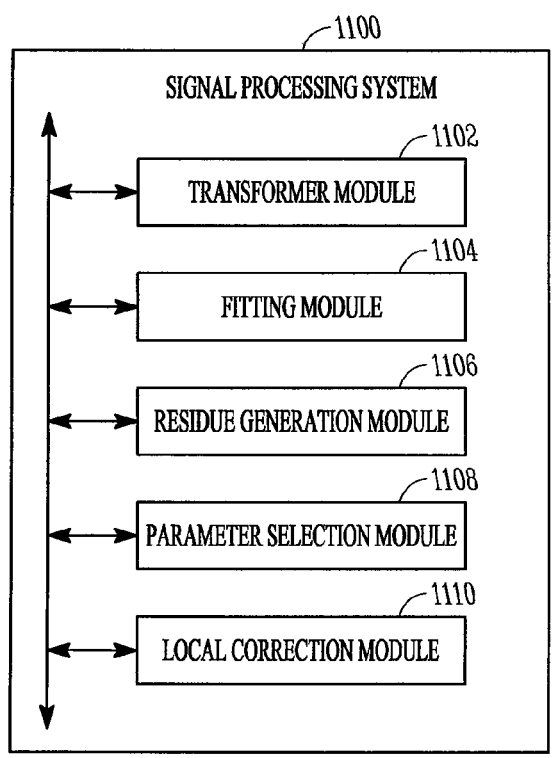
FIG. 11 is a signal processing subsystem that may be deployed in a signal processor of FIG. 2.

FIG. 11 illustrates an example signal processing subsystem 1100 that may be deployed in the signal processor 36 of the system 20 (see FIG. 2). The signal processing subsystem 1100 includes a transformer module 1102, a fitting module 1104, a residue generation module 1106, a parameter selection module 1108, and/or a local correction module 1110. Other modules may also be included.

The transformer module 1102 may generate a transform distribution from the reflected waveform that may include at least a first peak value having a first magnitude and a second peak value having a second magnitude. The absolute value of the first magnitude may be greater than an absolute value of the second magnitude. The transformer module 1102 may perform a discrete Fourier transform on the reflected waveform.

The fitting module 1104 may provide a local fit to the first peak value and the second peak value using a model function. The fitting module 1104 may locally fit a Gaussian distribution having an amplitude that approximately equals the first magnitude to the first peak value and locally fit a Gaussian distribution having an amplitude that approximately equals the second magnitude to the second peak value.

The residue generation module 1106 may generate a first residue distribution based upon the transform distribution and the local fit to the first peak value to identify a location of a first discontinuity and may generate a second residue distribution based upon the first residue distribution and the local fit to the second peak value to identify the location of a second discontinuity.

The parameter selection module 1108 may select a first fitting parameter for the Gaussian distribution locally fit to the first peak value and may select a second fitting parameter for the Gaussian distribution locally fit to the second peak value.

The local correction module 1110 may correct a location of at least one of the first peak value and the second peak value.

Figure 12:
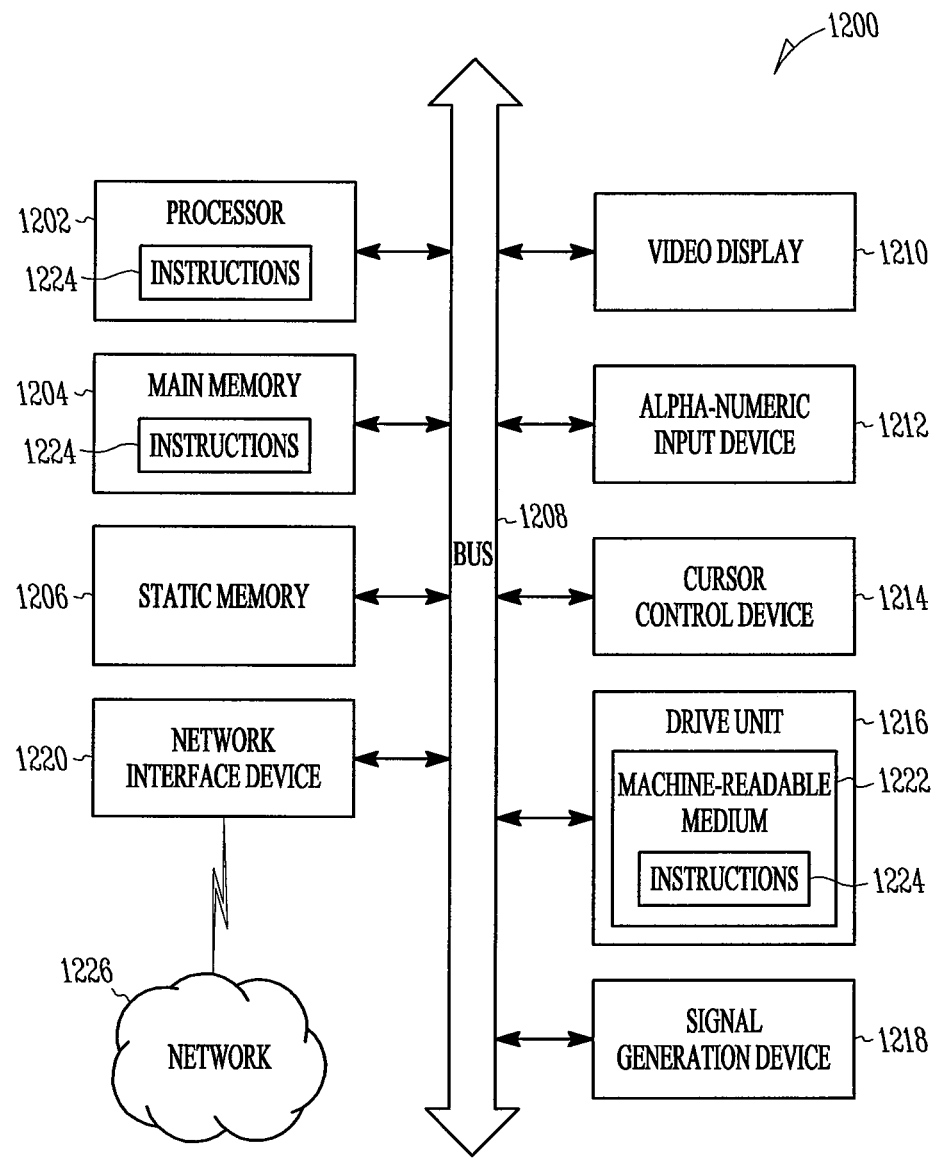
FIG. 12 is a block diagram of a machine in the example form of a computer system within which a set of instructions for causing the machine to perform any one or more of the methodologies discussed herein may be executed.

FIG. 12 shows a block diagram of a machine in the example form of a computer system 1200 within which a set of instructions may be executed causing the machine to perform any one or more of the methods, processes, operations, or methodologies discussed herein. The signal processor 36 may include the functionality of the one or more computer systems 1200.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, a kiosk, a point of sale (POS) device, a cash register, an Automated Teller Machine (ATM), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU) a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a cursor control device 1214 (e.g., a mouse), a drive unit 1216, a signal generation device 1218 (e.g., a speaker) and a network interface device 1220.

The drive unit 1216 includes a machine-readable medium 1222 on which is stored one or more sets of instructions (e.g., software 1224) embodying any one or more of the methodologies or functions described herein. The software 1224 may also reside, completely or at least partially, within the main memory 1204 and/or within the processor 1202 during execution thereof by the computer system 1200, the main memory 1204 and the processor 1202 also constituting machine-readable media.

The software 1224 may further be transmitted or received over a network 1226 via the network interface device 1220.

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical media, and magnetic media.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled.

Although specific embodiments have been illustrated and described herein, it should be appreciated that any arrangement calculated to achieve the same purpose may be substituted for the various embodiments shown. In addition, in the foregoing Detailed Description, it can be seen that various features may be grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the meaning of the claims.

What is claimed is:

1. A method, comprising:
projecting, by a system comprising a processor and a frequency domain reflectometer coupled to the processor, a signal having a predetermined frequency content into a communications link and detecting a reflected signal developed in response to the projected signal and received by the frequency domain reflectometer;
processing, by the system, the reflected signal received by the frequency domain reflectometer;
generating, by the system, a transformed distribution of the reflected signal, the transformed distribution comprising a reflection coefficient distribution represented by a magnitude of reflection coefficient values as a function of physical distance along the communications link;
subsequently selecting, by the system, a first peak reflection coefficient value in the reflection coefficient distribution, wherein a magnitude of the first peak reflection coefficient value is a highest magnitude when compared to other peak reflection coefficient values in the reflection coefficient distribution;
generating, by the system, a first model distribution using a first model function, the first model distribution representing magnitudes of reflection coefficient values as a function of physical distance along the communications link;
performing, by the system, a first local fit to the selected first peak reflection coefficient value using the first model function, wherein the first model function utilizes the magnitude of the selected first peak reflection coefficient value and determines by regression a first curve fitting parameter value until the first model function satisfies a first predetermined criterion;
forming, by the system, a first residue distribution of reflection coefficient values as a function of physical distance along the communications link, based upon a first difference between the reflection coefficient distribution and the first model distribution;
selecting, by the system, a second peak reflection coefficient value in the first residue distribution, wherein a magnitude of the second peak reflection coefficient value is a highest magnitude when compared to other peak reflection coefficient values in the first residue distribution;
performing, by the system, a second local fit to the selected second peak reflection coefficient value using a second model function that generates a second model distribution, wherein the second model function utilizes the magnitude of the selected second peak reflection coefficient value and determines by regression a second curve fitting parameter value until the second model function satisfies a second predetermined criterion;
forming, by the system, a second residue distribution based upon a second difference between the first residue distribution and the second model distribution;
identifying, by the system, a first location of a first discontinuity, based upon the first residue distribution;
identifying, by the system, a second location of a second discontinuity in the communications link, based upon the second residue distribution;
correcting, by the system, the first location, according to $$L_T = C_1 L_M + C_2$$

wherein $L_M$ represents a location identified in the identifying step, $C_1$ and $C_2$ represent empirically determined constants, and $L_T$ represents a corrected location;

outputting, by the system, for the first discontinuity, a first discontinuity location, a first discontinuity strength, and a first discontinuity type, and
outputting, by the system, for the second discontinuity, a second discontinuity location, a second discontinuity strength, and a second discontinuity type,
wherein the discontinuity location corresponds to the corrected location,
wherein the discontinuity strength corresponds to a peak magnitude in the reflection coefficient distribution, the discontinuity strength being positive or negative,
wherein the discontinuity type corresponds to an open termination for a positive discontinuity strength and a shorted termination for a negative discontinuity strength,
wherein the first curve fitting parameter value corresponds to the physical distance along the communications link,
wherein processing the reflected signal comprises performing a discrete Fourier transform on the reflected signal to generate the reflection coefficient distribution, and
wherein performing the first local fit to the selected first peak reflection coefficient value comprises locally fitting a Gaussian distribution having the magnitude of the selected first peak reflection coefficient value by varying the first curve fitting parameter value.

2. The method of claim 1, wherein performing the first local fit comprises fitting the Gaussian distribution to the selected first peak reflection coefficient value by performing an iterative regression until the Gaussian distribution satisfies the first predetermined criterion.

3. The method of claim 1, further comprising selecting another peak value from the first residue distribution having a next highest magnitude when compared to other peak values of the first residue distribution.

4. The method of claim 1, wherein selecting the first peak reflection coefficient value comprises selecting a first value having the highest magnitude when compared to other peak reflection coefficient values in the transformed distribution.

5. The method of claim 1, wherein the second peak reflection coefficient value has a second magnitude, and wherein the highest magnitude is greater than the second magnitude.

6. The method of claim 1, wherein the value of the curve fitting parameter is determined according to a chi-square regression analysis.

7. The method of claim 1, wherein $C_1$ has a value between approximately 0.8 and approximately 1.2.

8. The method of claim 7, wherein $C_2$ has a value between approximately 60 and approximately 70.

9. A method, comprising:
coupling, by a system comprising a frequency domain reflectometer coupled to a processor, a waveform having a varying frequency to a communications link at a selected location and measuring a reflected waveform at the selected location, the reflected waveform received by the frequency domain reflectometer;
processing, by the system, the reflected waveform received by the frequency domain reflectometer;
generating, by the system, a transformed distribution, the transformed distribution comprising a reflection coefficient distribution represented by a magnitude of reflection coefficient values as a function of physical distance along the communications link;
subsequently selecting, by the system, from the reflection coefficient distribution a first peak reflection coefficient value, wherein a first magnitude of the first peak reflection coefficient value is a highest magnitude when compared to other peak reflection coefficient values in the reflection coefficient distribution;

performing, by the system, a first local fit to the first peak reflection coefficient value using a first model function to generate a first model distribution, the first model distribution representing a model for magnitudes of reflection coefficient values as a function of physical distance along the communications link, wherein the first model function utilizes the first magnitude of the selected first peak reflection coefficient value and determines by regression a first curve fitting parameter value until the first model function satisfies a first predetermined criterion;

generating, by the system, a first residue distribution based upon the reflection coefficient distribution and the first local fit to the first peak reflection coefficient value to identify a first location of a first discontinuity, the first residue distribution representing residue reflection coefficient values as a function of physical distance along the communications link;

identifying, by the system, a second peak reflection coefficient value in the first residue distribution, wherein a second magnitude of the second peak reflection coefficient value is a higher magnitude than other peak reflection coefficient values in the first residue distribution;

performing, by the system, a second local fit to the second peak reflection coefficient value using a second model function to generate a second model distribution, wherein the second model function utilizes the second magnitude of the second peak reflection coefficient value and determines by regression a second curve fitting parameter value until the second model function satisfies a second predetermined criterion;

generating, by the system, a second residue distribution based upon the first residue distribution and the second local fit to the second peak reflection coefficient value to identify a second location of a second discontinuity;

correcting, by the system, the first location, according to $$L_T = C_1 L_M + C_2$$

wherein $L_M$ represents a location identified in the identifying step, $C_1$ and $C_2$ represent empirically determined constants, and $L_T$ represents a corrected location;

outputting, by the system, for the first discontinuity a first discontinuity location, a first discontinuity strength, and a first discontinuity type, and outputting, by the system, for the second discontinuity, a second discontinuity location, a second discontinuity strength, and a second discontinuity type, wherein generating the second residue distribution comprises determining a difference between the first residue distribution and the second local fit to the second peak reflection coefficient value, wherein the discontinuity location corresponds to the corrected location, wherein $C_1$ has a value between approximately 0.8 and approximately 1.2, and wherein $C_2$ has a value between approximately 60 and approximately 70, wherein the first discontinuity strength corresponds to a peak magnitude in the reflection coefficient distribution, the first discontinuity strength being positive or negative, wherein the first discontinuity type corresponds to an open termination for a positive first discontinuity strength and a shorted termination for a negative first discontinuity strength, wherein the first curve fitting parameter value corresponds to the physical distance along the communications link, wherein processing the reflected waveform comprises performing a discrete Fourier transform on the reflected waveform, and wherein generating the first residue distribution comprises determining a difference between the reflection coefficient distribution and the first local fit to the first peak reflection coefficient value.

10. The method of claim 9, wherein performing the first local fit comprises fitting a Gaussian distribution to the selected first peak reflection coefficient value by performing iterative regression until the Gaussian distribution satisfies the first predetermined criterion.

11. The method of claim 9, further comprising selecting another peak value from the first residue distribution having a next highest magnitude when compared to other peak values of the first residue distribution.

12. The method of claim 9, wherein the second peak reflection coefficient value has a second magnitude, and wherein the highest magnitude is greater than the second magnitude.

13. The method of claim 9, wherein performing the first local fit to the first peak reflection coefficient value comprises locally fitting a Gaussian distribution having an amplitude that approximately equals the first magnitude.

14. The method of claim 9, wherein performing the second local fit to the second peak reflection coefficient value comprises locally fitting a Gaussian distribution having an amplitude that approximately equals the second magnitude.

15. The method of claim 9, wherein performing the first local fit comprises locally fitting a Gaussian distribution having an amplitude that approximately equals the first magnitude of the first peak reflection coefficient value.

16. A system, comprising:

a frequency domain reflectometer;

a signal processor operably coupled to the frequency domain reflectometer;

a memory storing instructions; and a processor coupled to the frequency domain reflectometer and the memory, wherein responsive to executing the instructions, the processor performs operations comprising:

causing the frequency domain reflectometer to transmit on a communications link a waveform having a varying frequency;

causing the frequency domain reflectometer to receive a reflected waveform from the communications link;

generating a transformed distribution from the reflected waveform, the transformed distribution comprising a reflection coefficient distribution represented by a magnitude of reflection coefficient values as a function of physical distance along the communications link;

subsequently selecting a first peak reflection coefficient value, wherein a first magnitude of the first peak reflection coefficient value is a highest magnitude when compared to other peak reflection coefficient values in the reflection coefficient distribution;

performing a first local fit to the first peak reflection coefficient value using a first model function that generates a first model distribution, the first model distribution representing a model for magnitudes of reflection coefficient values as a function of physical distance along the communications link, wherein the first model function utilizes the first magnitude of the selected first peak reflection coefficient value and determines by regression a first curve fitting parameter value until the first model function satisfies a first predetermined criterion; and generating a first residue distribution based upon the reflection coefficient distribution and the first local fit to the first peak reflection coefficient value to identify a first location of a first discontinuity, the first residue distribution representing residue reflection coefficient values as a function of physical distance along the communications link;

generating a second residue distribution based upon the first residue distribution and a second local fit to a second peak reflection coefficient value of the first residue distribution to identify a second location of a second discontinuity;

correcting the first location and the second location, according to $$L_T = C_1 L_M + C_2$$

wherein $L_M$ represents a location identified in the identifying step, $C_1$ and $C_2$ represent empirically determined constants, and $L_T$ represents a corrected location, and outputting, for the first discontinuity and the second discontinuity respectively, a discontinuity location, a discontinuity strength, and a discontinuity type, wherein the discontinuity location corresponds to the corrected location, wherein $C_1$ has a value between approximately 0.8 and approximately 1.2, and wherein $C_2$ has a value between approximately 60 and approximately 70, wherein the discontinuity strength corresponds to a peak magnitude in the reflection coefficient distribution, the discontinuity strength being positive or negative, wherein the discontinuity type corresponds to an open termination for a positive discontinuity strength and a shorted termination for a negative discontinuity strength, and wherein the first curve fitting parameter value corresponds to the physical distance along the communications link, wherein the generating of the reflection coefficient distribution is performed according to a discrete Fourier transform applied to the reflected waveform, and wherein the performing of the first local fit comprises locally fitting a Gaussian distribution having an amplitude that approximately equals the first magnitude of the first peak reflection coefficient value.

17. The system of claim 16, wherein performing the first local fit comprises fitting the Gaussian distribution to the selected first peak reflection coefficient value by performing iterative regression until the Gaussian distribution satisfies the first predetermined criterion.

18. The system of claim 16, wherein the second local fit is determined according to a second curve fitting parameter of the Gaussian distribution to locally fit to the second peak reflection coefficient value.

19. The system of claim 16, further comprising selecting another peak value from the first residue distribution having a next highest magnitude when compared to other peak values of the first residue distribution.

20. The system of claim 16, wherein the frequency domain reflectometer or the signal processor is incorporated into a line card coupled to the communications link.

* * * * *